United States Patent
Liu et al.

(10) Patent No.: US 6,798,177 B1
(45) Date of Patent: Sep. 28, 2004

(54) BOOST-BUCK CASCADE CONVERTER FOR PULSATING LOADS

(75) Inventors: Kwang H. Liu, Sunnyvale, CA (US); Sorin L. Negru, San Jose, CA (US); Fu-Yuan Shih, Taipei (TW); George Hsieh, Taipei (TW)

(73) Assignee: Arques Technology, Inc., Santa Clara, CA (US)

( * ) Notice: Subject to any disclaimer, the term of this patent is extended or adjusted under 35 U.S.C. 154(b) by 0 days.

(21) Appl. No.: 10/272,538

(22) Filed: Oct. 15, 2002

(51) Int. Cl.$^7$ .............................................. G05F 1/613
(52) U.S. Cl. ...................... 323/222; 323/266; 323/271; 323/282
(58) Field of Search ................................ 323/222, 266, 323/271, 282

(56) References Cited

U.S. PATENT DOCUMENTS

| | | | | | |
|---|---|---|---|---|---|
| 4,533,986 A | * | 8/1985 | Jones | ........................... | 363/17 |
| 4,626,766 A | * | 12/1986 | Musil | ......................... | 323/222 |
| 4,743,835 A | * | 5/1988 | Bosse et al. | ................ | 323/266 |
| 4,754,388 A | * | 6/1988 | Pospisil | ....................... | 363/54 |
| 4,881,023 A | * | 11/1989 | Perusse et al. | ............. | 323/266 |
| 5,006,782 A | * | 4/1991 | Pelly | .......................... | 323/225 |
| 5,036,269 A | * | 7/1991 | Murari et al. | .............. | 323/266 |
| 5,132,606 A | * | 7/1992 | Herbert | ...................... | 323/266 |
| 5,216,353 A | * | 6/1993 | Mori | ........................... | 323/266 |
| 5,255,174 A | | 10/1993 | Murugan | ...................... | 363/17 |
| 5,436,550 A | * | 7/1995 | Arakawa | ..................... | 323/222 |
| 5,565,761 A | * | 10/1996 | Hwang | ........................ | 323/222 |
| 5,691,629 A | * | 11/1997 | Belnap | ........................ | 323/266 |
| 5,721,483 A | | 2/1998 | Kolluri et al. | .............. | 323/224 |
| 5,742,151 A | * | 4/1998 | Hwang | ........................ | 323/222 |
| 5,804,950 A | * | 9/1998 | Hwang et al. | ............. | 323/222 |
| 5,831,418 A | | 11/1998 | Kitagawa | .................... | 323/222 |
| 6,008,631 A | * | 12/1999 | Johari | ......................... | 323/266 |
| 6,094,036 A | * | 7/2000 | Rampold | .................... | 323/266 |
| 6,320,357 B1 | * | 11/2001 | Peters et al. | ................ | 323/222 |
| 6,469,478 B1 | * | 10/2002 | Curtin | ........................ | 323/266 |

* cited by examiner

*Primary Examiner*—Jeffrey Sterrett
(74) *Attorney, Agent, or Firm*—Anthony B. Diependbrock, III; Dechert LLP (57) ABSTRACT

A power converter including a first stage, a reservoir capacitor and a second stage. The first stage converts the voltage of a primary energy source, such as a battery, to a voltage on the reservoir capacitor, which stores a large amount of energy in the form of a voltage substantially larger than the voltage of the primary energy source. The second stage converts the voltage on the reservoir capacitor to a substantially constant voltage for a load device that demands current having the form of large, short, current pulses. The cascaded converter prevents the pulsating load currents of the load device, such as a GSM power amplifier, from causing a severe voltage loss at the battery. This increases the power available from the battery and reduces loses from the internal resistance of the battery.

18 Claims, 9 Drawing Sheets

FIG. 1

(Prior Art)

BOOST-BUCK CASCADE CONVERTER FOR PULSATING LOADS

CROSS-REFERENCE TO RELATED APPLICATIONS

1. Field of the Invention

The present invention generally relates to power converters and more particularly a cascaded converter capable of storing energy in a reservoir capacitor and insulating pulsating load currents from a primary energy source, such as a battery.

2. Description of the Related Art

Many of today's wireless phones or cellular phones transmit signals in a time-division multiple access (TDMA) scheme such as GSM (Global System for Mobile Communications) or GPRS (General Packet Radio Signal). Up to eight phones share a frequency band and each phone transmits signals in a burst.

However, the operation of a TDMA phone causes a pulsating load current to be drawn from a battery source. Due to high source resistance in a battery, such as a lithium-ion battery, a pulsating load current can cause a severe voltage droop problem. In addition, pulsating load current aggravates the power loss caused by the source resistance.

Figure 1:
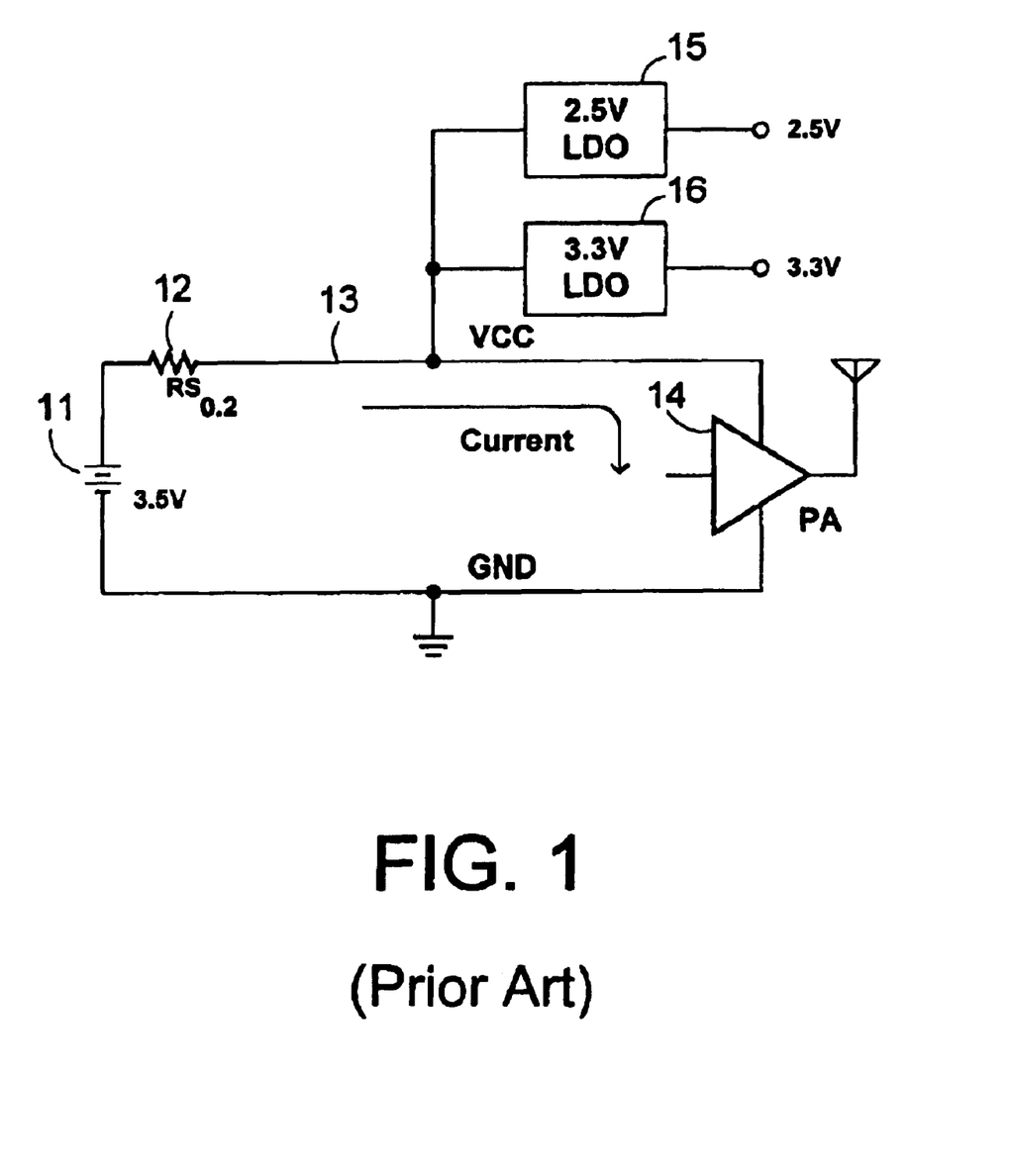
FIG. 1 shows a typical GSM power amplifier drawing a pulsating current from a lithium-ion battery.

FIG. 1 shows a power system for a typical cellular phone handset. A lithium-ion battery 11 supplies an output voltage VCC 13 directly to an RF Power Amplifier (PA) 14. The battery output voltage VCC 13 also supports several linear regulators such as regulators 15, 16, for a digital signal processor and a flash memory, respectively. A typical lithium-ion battery for cellular phone has a substantial source resistance. A resistance of about 0.2Ω, modeled by resistor Rs 12, includes the source resistance and other resistances such as fuse and battery contacts.

Figure 2A:
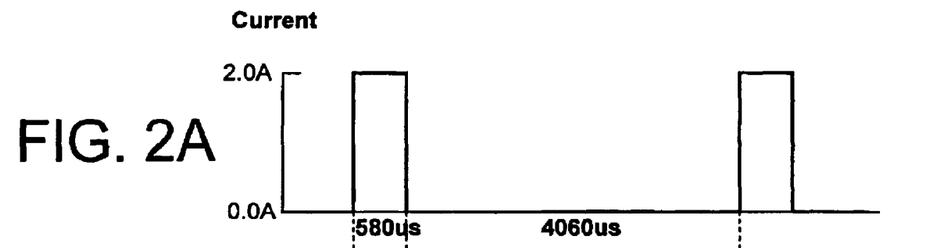
FIG. 2A shows the pulsating current waveform of the GSM power amplifier of FIG. 1.

FIG. 2A shows the waveform of a pulsating load current drawn by a typical power-amplifier 14 for the above mentioned applications. The power-amp 14 draws about 2 Amperes (A) for about 580 microseconds ($\mu$S) in burst transmission period (with a transition time of about 10 $\mu$S), and rests, in an idle period, for about 4060 $\mu$S. Thus, there are eight such transmission periods within the total cycle time of 4640 $\mu$S, and the duty cycle of each burst is one eighth. For proper operation of the power amplifier PA 14, it is important for the voltage on node 13 to have small ripple (typically less than 0.3 V). In addition, the RF PA 14 requires a minimum operating voltage of 3.3 V to assure sufficient transmission power and communication quality.

Figure 2B:
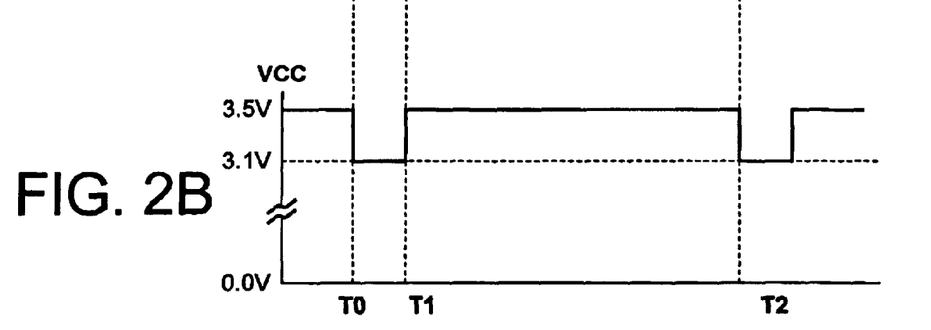
FIG. 2B shows the waveform of the battery output voltage under a pulsating load current.

FIG. 2B shows the waveform of the VCC node 13, whose voltage drops from about 3.5 V to 3.1 V because of the 2 A peak current that is required during a transmission interval. The 0.4V ripple exceeds the ripple requirement of 0.3 V for the RF PA 14. Furthermore, whenever the battery voltage falls below 3.7 V, VCC drops below 3.3 V during a 2 A load pulse. In other words, battery 11 cannot be used to support either the RF PA 14 or the LDO 16 if its voltage drops below 3.7 V, leaving as much as 40% of the battery's total energy unusable.

The power loss for a pulsating current, such as is shown in FIG. 2A, is the product of the source resistance Rs and the square of the Root-Mean Square (RMS) value of the current. In this case, the power dissipated by Rs is approximately ($\sqrt{2^{2/8}})^2 \times 0.2\Omega = 0.1$ W. Since the power consumed by the load is (2/8)A×3.3 V=0.825 W, the power loss from Rs 12 amounts to about 12% of the load power.

Another drawback for a power amplifier operating on an unregulated voltage is wasted power. When a lithium-ion battery is fully recharged, it has a nominal 4.2V output voltage. Driving the PA with 4.2 V consumes, $$\frac{\left(\sqrt{4.2^2/8}\right)^2}{1.65\ \Omega},$$

or about 1.34 W over an entire transmission cycle, i.e., from the beginning of T0 to the beginning of T2 in FIG. 2A. Compared with the 0.825 W that is actually required during the transmission, about 63% of battery power is wasted in over-driving the power amplifier.

Figure 3:
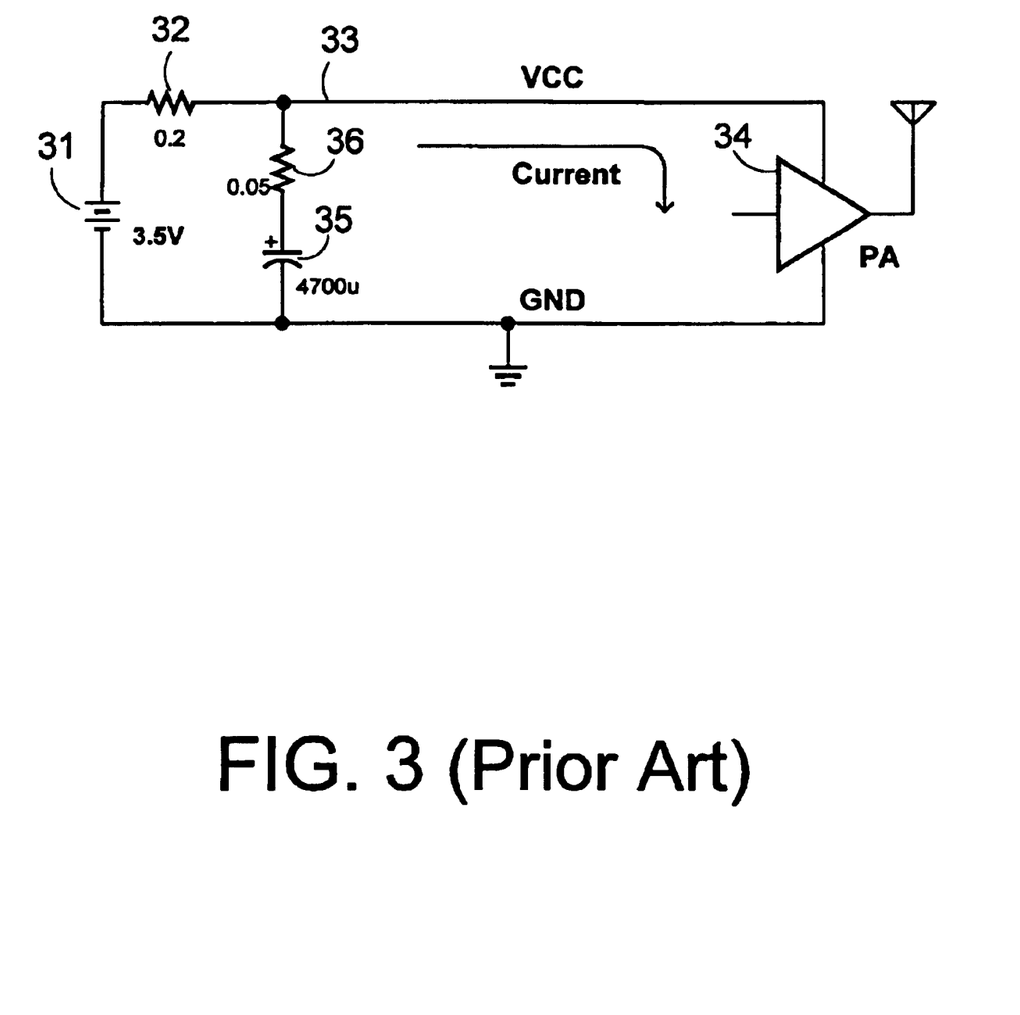
FIG. 3 shows prior art in which a large capacitor is used to reduce the voltage droop caused by a pulsating load current.

FIG. 3 shows a prior-art circuit that employs a large storage capacitor to reduce the effects of pulsating load current on a battery source with a substantial source resistance. A 4700 $\mu$F capacitor 35, having an equivalent series resistance (ESR) 36 of about 50 mΩ, is connected in parallel with the lithium-ion battery 31, which has a 0.2Ω internal resistance 32. The energy stored in capacitor 35 provides a low impedance energy source for the pulsating current of the RF power amplifier 34 and helps to reduce the voltage droop of the battery output voltage 33.

Figure 4A:
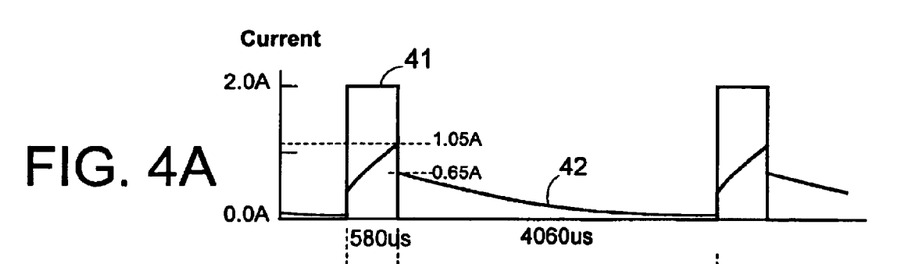
FIG. 4A shows the current waveforms of the GSM PA and the battery output of the circuit as shown in FIG. 3.

FIG. 4A shows the waveforms of the current drawn by the PA 34 in FIG. 3 and the current supplied by the battery 31. In particular, waveform 41 shows the PA 34 drawing 2 A during the 580 $\mu$S transmission interval and no current outside of the interval. Waveform 42 shows the current supplied by the battery 31. The difference between the two waveforms is the current supplied by the capacitor 35. As is clear from the figure, the addition of capacitor 35 reduces the ripple and RMS value of the battery output current.

Figure 4B:
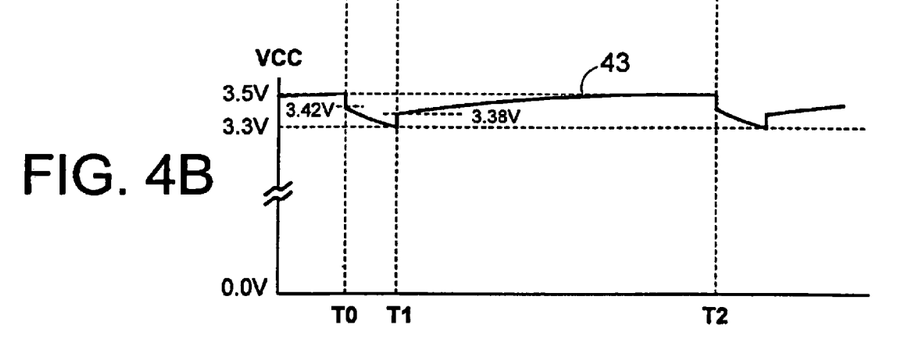
FIG. 4B shows the waveform of the battery output voltage of the circuit as shown in FIG. 3.

FIG. 4B shows the waveform 43 of the battery output voltage 33 with the additional capacitor 35. The battery output voltage ripple is reduced to about 0.2 V. Starting at time T0, a 2 A current flows causing about 0.08 V to be dropped across the 50 mΩ ESR 36 of capacitor 35. Between T0 and T1, capacitor 35 provides the most of the load current to PA 34. Battery current increases gradually from about 0.4 A at T0 to about 1.05 A at T1, and VCC 33 drops further from 3.42 V to about 3.3 V at T1.

At T1, the load current of PA 34 drops to zero. Voltage VCC 33 jumps back to 3.38 V (due to the ESR effect). Battery output current now gradually recharges capacitor 35 back to 3.5 V at T2 to prepare for another current pulse at T2.

It is clear that adding a large capacitor in parallel to a battery reduces the ripple voltage to less than 0.2 V, and extends the usable battery voltage range to about 3.5 V from the previous 3.7V. However, a 4700 $\mu$F capacitor adds significantly to the cost of the system. Such a capacitor is bulky and requires a large amount of PC board space. Furthermore, adding a large capacitor will not reduce wasted power when the battery has a high voltage (greater than 3.8V).

Thus, there is a need for a method and apparatus that uses a much smaller capacitor to reduce the ripple voltage of a RF power amplifier in a cellular phone handset, that regulates the supply voltage to the PA at 3.3V, and that avoids over-driving the PA when the battery voltage is substantially higher than 3.3V.

BRIEF SUMMARY OF THE INVENTION

The present invention is directed to these needs. A method in accordance with the present invention includes providing a voltage on a reservoir capacitor by converting a voltage and current provided by a primary power source, and maintaining an average constant current supplied to the reservoir capacitor, where the capacitor voltage is greater than the power source voltage. The method further includes, while maintaining average constant current to the reservoir capacitor, converting the capacitor voltage to a predetermined output voltage for the load device, and maintaining the predetermined output voltage substantially constant, while providing a current pulse to the load device.

An apparatus in accordance with the present invention includes a reservoir capacitor, a first converter stage and a second converter stage. The reservoir capacitor is used to store energy obtained from a primary power source. The first converter stage is configured to convert the primary power source voltage to a voltage on the reservoir capacitor while maintaining a substantially constant average current to the reservoir capacitor. The second converter stage is configured to convert the capacitor voltage to an output voltage for a load device, while maintaining the output voltage substantially constant and providing a current pulse to the load device. According to a version of the invention, the first converter stage is a boost converter and the second converter stage is a buck converter. Between the two converters is the reservoir capacitor. The present invention uses relatively small reservoir capacitor to store energy at an elevated voltage. The boost converter stage essentially stretches the pulsating load current to almost a constant current (having a very small RMS to DC ratio), thus, greatly reducing the voltage droop and power loss across the source resistance of the battery.

The buck converter stage is capable of regulating the VCC voltage of the PA, by drawing power from the reservoir capacitor. Since the reservoir capacitor can store a relatively large amount of energy in the form of elevated voltage, the pulsating load current will only produce a large voltage droop on this reservoir capacitor, not on the battery.

One advantage of the present invention is that a much smaller energy-storage capacitor can be used.

Another advantage is that the load current waveform is changed from a high peak, low duty cycle waveform to a nearly constant waveform.

Yet other advantages are that (i) the power loss from the battery source resistance is reduced, thereby improving efficiency, (ii) the usable battery voltage is extended from 3.5 V to 2.8 V, which increases usable battery life, (iii) talk time is extended without over-driving the PA when the battery voltage is substantially higher than the 3.3V that is required by the PA, and (iv) increased power and thus communication range are available in an emergency situation, by setting PA's VCC to 4.0 Volts.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 5:
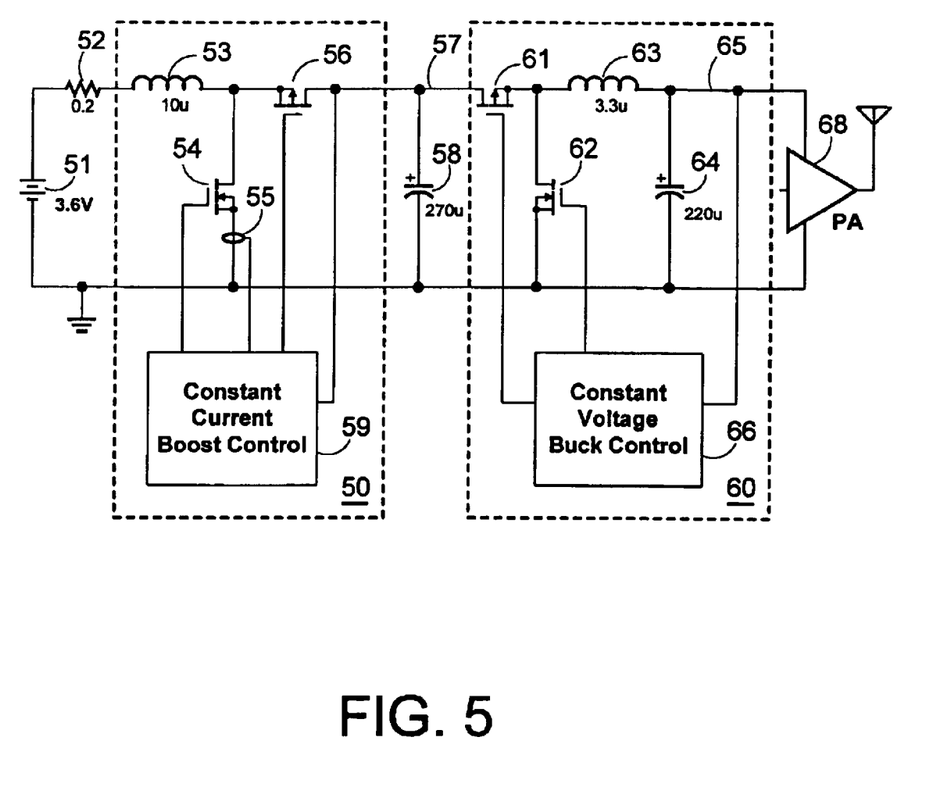
FIG. 5 shows a preferred embodiment of the present invention using a boost converter input stage followed by a small reservoir capacitor and a buck converter output stage.

FIG. 5 shows one embodiment of a converter in accordance with the present invention. The converter includes an input stage 50, a reservoir capacitor 58, and an output stage 60. The input stage includes an input inductor 53, first and second switches 54, 56, a current sense circuit 55, and a first control circuit 59. The output stage includes third and fourth switches 61, 62, an output inductor 63, an output capacitor 64, and a second control circuit 66. The input inductor 53 receives a battery voltage, such as 3.6 volts from a lithium-ion battery 51, and the output capacitor connects to a power amplifier, such as PA 68 shown in FIG. 5.

The input stage 50 operates to boost the voltage on the reservoir capacitor 58 to a level greater than the battery voltage. The charging current delivered to the reservoir capacitor 58 is about 50% of the current drawn from the battery by the input stage 50. The output stage 60 operates to down convert the boosted voltage on the reservoir capacitor 58 to an output voltage, for example, 3.4V, needed by PA 68, which the stage regulates. During the transmission period, the reservoir capacitor 58 supplies, via the output stage, most of the energy to PA 68. The input stage supplies only a small portion of the energy ($\eta_1 \times \eta_2 \times 0.3A \times 3.6V \times 580 \mu s$)=565 $\mu J$ (microJoules)) delivered during the transmission period, where $\eta_1$ is the efficiency of the input stage, typically about 95% and $\mu_2$ is the efficiency of the output stage, also about 95%.

Figure 6A:
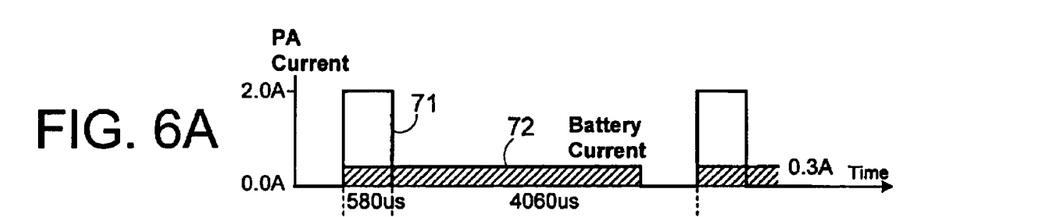
FIG. 6A and FIG. 6B show key waveforms of the circuit as shown in FIG. 5.
Figure 6B:
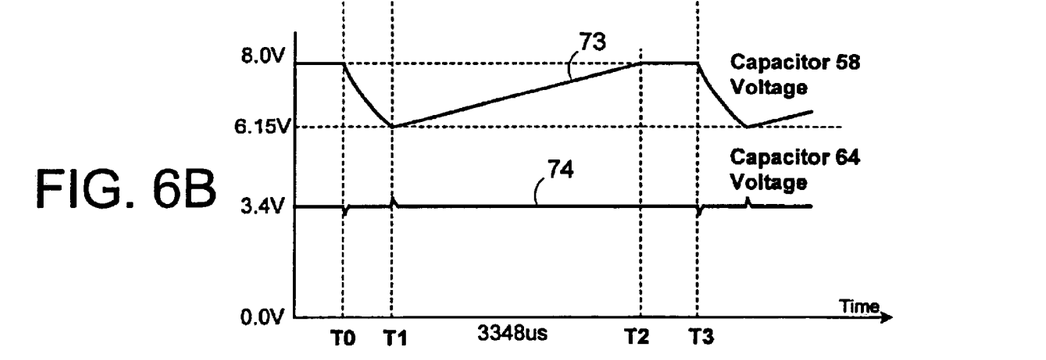

Waveform 71 in FIG. 6A shows the current needed by the power amplifier 68, and waveform 72 shows the battery output current. Waveform 73 in FIG. 6B shows the voltage across the reservoir capacitor 58 and waveform 74 shows VCC voltage 65 at the PA 68.

When the PA begins a transmission, voltage 57, in FIG. 5, falls gradually from 8.0V ($V_1$) at T0 to about 6.15 V ($V_2$) by T1. The remaining voltage V2 on the reservoir capacitor 58 is determined by the following equation:

$$\eta_2 \cdot 0.5 \cdot C_{RES} \cdot (V_1^2 - V_2^2) + \eta_1 \cdot \eta_2 \cdot P_{BATT} \cdot T_{ON} = P_{PA} \cdot T_{ON}$$

where $\eta_2$ is the efficiency of the output stage, $\eta_1$ is the reservoir capacitor 58 voltage when it is fully charged (8.0 V), $V_2$ is the remaining reservoir capacitor voltage at T1, $T_{ON}$ is the transmission interval, $\eta_1$ is the efficiency of the input stage, $P_{BATT}$ is the power delivered by the battery during the interval, and $P_{PA}$ is the power consumed by the power amplifier during the transmission interval. The above equation states that the net energy delivered by the reservoir capacitor equals the energy consumed in the power amplifier.

The energy consumed by the load is ($V_{PA}I_{PA}T_{ON}$). Assuming $I_{PA}$=2 A, $V_{PA}$=3.4 Volts at the power amp and $T_{ON}$=580 μs, the energy consumed by the power amp is 3,944 μJ.

The net energy supplied to the load by the battery is $\eta_1\eta_2V_{BATT}I_{BATT}T_{ON}$. If the battery voltage $V_{BATT}$=3.6 volts, and $I_{BATT}$=0.3 Amps, and the input stage efficiency $\eta_1$ is 95%, the energy supplied by the battery is 565 μJ.

This means that the reservoir capacitor need only supply about 3,379 μJ. If charged to 8.0 volts ($V_1$), a reservoir capacitor with a value of $C_{RES}$=270 μF has an energy storage of about 8,208 μJ. This is a relatively large amount of energy, much more than is needed by the load. Thus, the reservoir capacitor 58 discharges to a remaining voltage of about 6.15 volts, after the transmission interval T0–T1.

After T1, the power amplifier PA 68 is idle for about 4.06 msec. The input stage continues to provide 150 mA of average output current to recharge capacitor 58. At T2, about 3.35 msec after T1, the capacitor 58 is recharged to 8.0V, at which point the input stage stops further charging. At T3, the power amplifier PA 68 starts its next transmission period.

Figure 7:
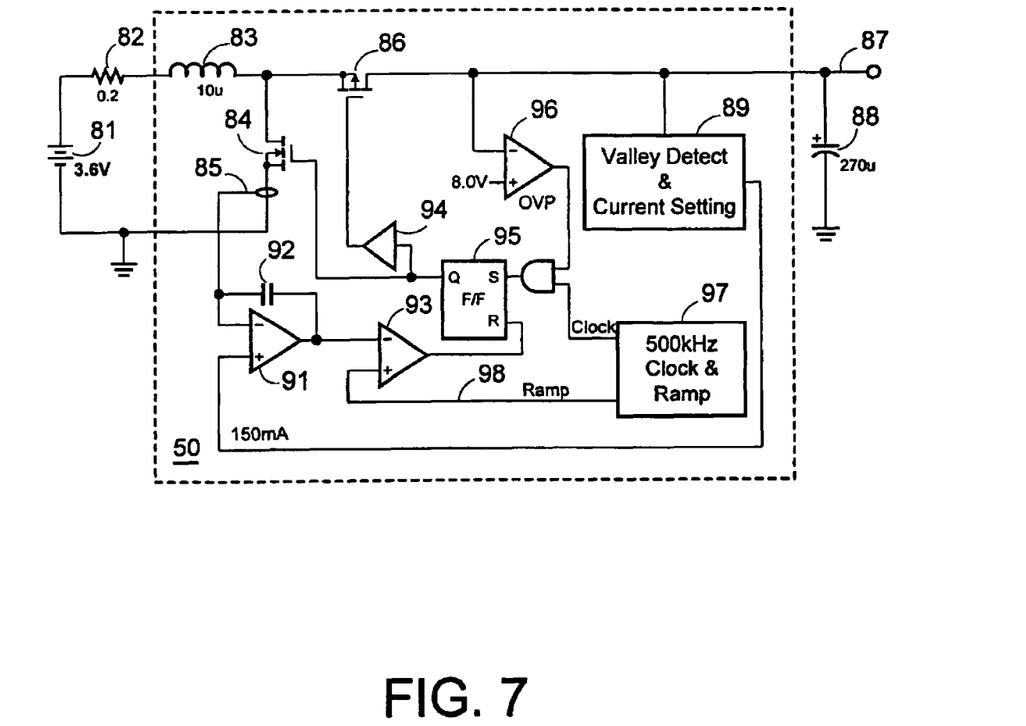
FIG. 7 shows a detailed embodiment of the boost converter input stage of the FIG. 5 circuit.

FIG. 7 shows an embodiment of the input stage in accordance with the present invention. The input stage includes an input inductor 83, a first switch 84, a second switch 86, a current sense circuit 85, and a control circuit 50. In one embodiment, the first switch 84 is a n-channel transistor and the second switch is a p-channel transistor. The control circuit includes an operational amplifier (OP-AMP) 91, a compensation capacitor 92, a first comparator 93, a level shifter 94, a SR flip-flop 95, a Clock & Ramp generator 97, a second comparator 96, and a Valley-voltage detect & Current-setting circuit 89.

The inductor 83 and the second switch 86 are connected in series between the battery 81 and the reservoir capacitor 88. The first switch 84 is connected between ground and the junction of the inductor 83 and the second switch 86. The control circuit connects to the first switch 84 and the second switch 86 in four places, the control input of the first switch 84, the control input of the second switch 86, the side of first switch 84 that connects to ground, and the output 87 of switch 86. The control circuit thereby controls the state of the switches 84, 86 and senses the current in the first switch 84 and the voltage at the output of the second switch 86.

In the control circuit 50, the control inputs of the switches are driven by a SR flip-flop 95. The control input of the first switch 84 connects, in one embodiment, directly to the Q output of the SR flip-flop 95 and the control input of the second switch 86 connects, via the level shifter 94, to the Q output. In an embodiment in which first and second switches 84, 86 are implemented as n-channel and p-channel transistors, respectively, first switch 84 is on when second switch 86 is off and visa-versa. The S input of the flip-flop 95 is connected to an 'AND' gate whose inputs receive the clock output of the Clock & Ramp circuit 57 and the output of the second comparator 96. The second comparator 96 has a positive input connected to a reference voltage, e.g., 8.0 volts, and a negative input connected to the output 87 of switch 86. Normally, the output of the second comparator 96 is high, enabling the AND gate, and allowing the S input of the flip-flop to receive the clock output of the Clock & Ramp circuit 97. Setting the flip-flop 95, causes its Q output to have a logic high state, which, in turn, causes first switch 84 to be on and switch 86 to be off. When switch 84 is on, the inductor 83 is charged by the battery. When switch 84 turns off and switch 86 turns on, the charged inductor delivers its energy to the reservoir capacitor 88, by charging the reservoir capacitor 88.

The reset input of the flip-flop 95 is connected to the output of the first comparator 93, which has a positive input connected to the ramp output of the Clock & Ramp circuit 97, and a negative input connected to the output of OP-AMP 91. OP-AMP 91 has a positive input connected to the output of the Valley Detect & Current Setting circuit 89, and a negative input connected to a current sensing circuit output 85. A compensation capacitor 92 is connected from the output of OP-AMP 91 to its negative input, and the current sensing circuit 85 is connected to the side of the first switch 84 that connects to ground. The Valley Detect & Current Setting circuit 89 has an input connected to the output 87 of the reservoir capacitor 88.

The current sense circuit 85 detects the average current flowing through switch 84. OP-AMP 91 and the close loop control of the input stage maintain the average current in first switch 84 to about 150 mA. In particular, the OP-AMP 91 provides a determination of whether the current in the first switch 84 is at the predetermined current level provided by the Valley Detect & Current Setting circuit 89. If the current in the first switch 84 is less than the predetermined current level, then the output voltage of OP-AMP 91 moves higher and causes the first comparator 91 to produce a reset pulse to the flip-flop that is further delayed from the time the flip-flop is set. This keeps switch 84 on longer causing an increase in the current flowing in the first switch 84. If the current in the first switch 84 is greater than the predetermined current level, then the first comparator produces a reset pulse sooner after the flip-flop 95 is set, causing first switch 84 to shut off sooner thereby maintaining or decreasing the current in the first switch 84. Additionally, the voltage at the output of the input stage is sensed, and if greater than a predetermined voltage level, the second comparator 96 in conjunction with a logic AND gate, prevents the flip-flop 95, from being set.

Figure 8A:
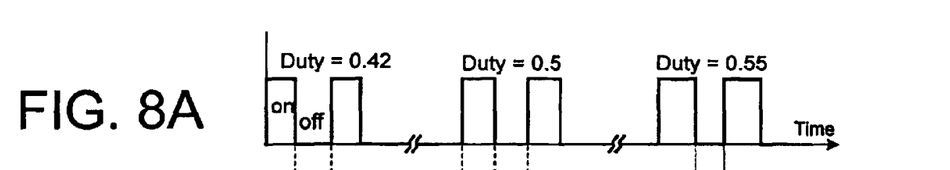
FIG. 8A shows the duty cycle variation of the boost converter as a function of the output voltage.

FIG. 8A shows the duty cycle variation at different voltage levels of capacitor 88, where duty cycle is defined as the ratio of the on-time to the cycle time (i.e., the sum of the on-time and off-time) of switch 84. Assuming battery output voltage is 3.6 V, and an early stage of recharging, the voltage 87 of capacitor 88 is at 6.2 V, the duty cycle is about 42%, As voltage 87 increases, both the Vo/Vin ratio and the duty cycle increase. At 7.2V, the duty cycle is 50% and at 8.0V, the duty cycle is 55%.

Figure 8B:
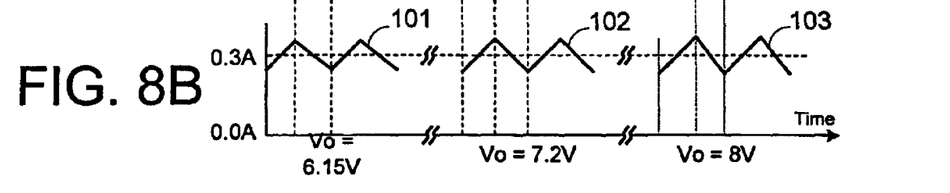
FIG. 8B shows a boost converter inductor current waveform for different output voltage conditions.

FIG. 8B shows the current waveform of inductor 83 at these different duty cycles. Waveform 101 occurs when $V_{BATT}$=3.6V, $V_{RES}$=6.15 V, and duty cycle is 42%. Waveform 102 is when $V_{BATT}$=3.6V, $V_{RES}$=7.2 V, and duty cycle is 50%. Waveform 103 is when $V_{BATT}$=3.6V, $V_{RES}$=8.0 V, and duty cycle is 55%. It is clear that as the duty cycle of switch 84 increases, the amount of ripple in the current waveform increases.

Figures 9A, 9B:
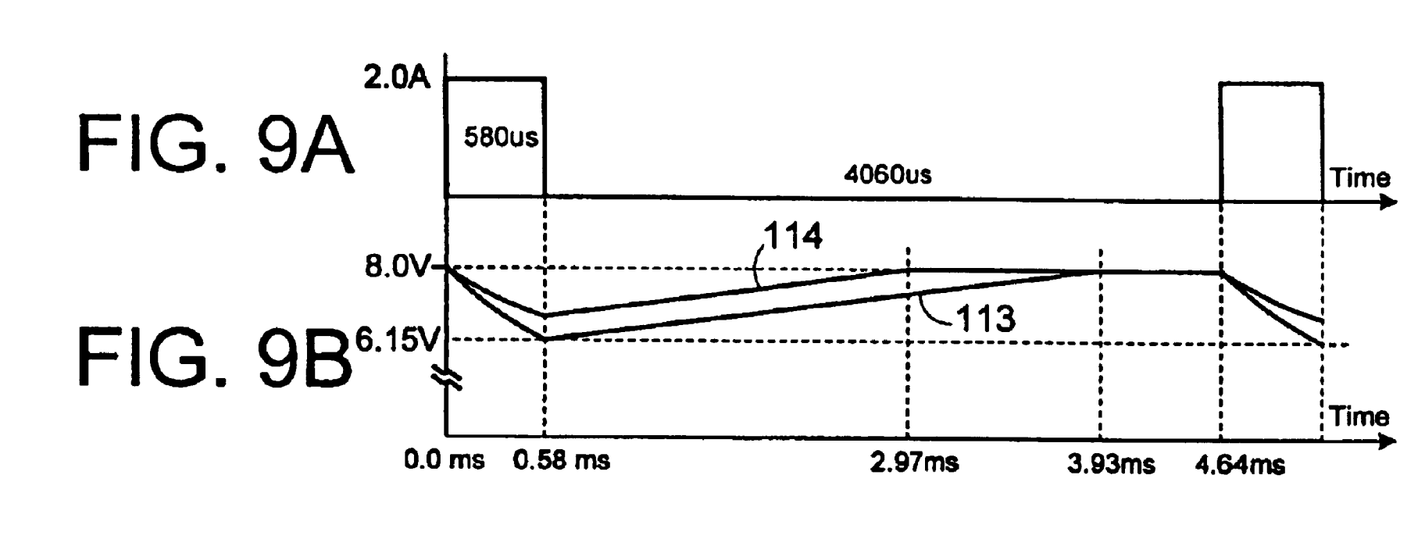
FIG. 9A shows a load current waveform.
FIG. 9B shows the waveforms when the boost converter re-charges the reservoir capacitor at different load current magnitude.

FIG. 9A shows a current waveform for a GSM power amplifier. The power amplifier transmits for about 580 μsec, and then idles for 4.06 msec.

FIG. 9B shows the voltage waveform for capacitor 88 in FIG. 7, when recharged by a 300 mA constant current converter stage. If the $V_{PA}$ is set to 3.4 V and draws an $I_{PA}$ of 2 A in a transmission, the voltage 87 drops to 6.15 V at the end of 580 μsec transmission interval. It takes the input stage about 3.35 msec to recharge capacitor 88 back to 8.0V. This is shown as waveform 113 in FIG. 9B. As soon as voltage 87 reaches 8.0V, comparator 96 in FIG. 7 outputs a logic low state, inhibiting flip-flop 95 from turning on switch 84, and the input stage stops delivering charging current to reservoir capacitor 88.

If the PA draws less energy during the transmission, by setting $V_{PA}$ to 3.0V is used during a transmission interval. Voltage 87 drops to 6.67 V. In this case, it takes only 2.39 msec to recharge capacitor 88 from 6.67 V to 8.0 V. This is shown as waveform 114 in FIG. 9B.

During transmission periods, valley detect circuit 89 monitors the level of voltage 87 at the end of a 580 μsec transmission interval. During receiving intervals, the PA is turned off and consumes no power and the Valley Detect circuit 89 voltage 87 remains at 8.0 V. It sets the reference current level of 0 mA to OP-AMP 91, thereby turning off the input stage.

On the other hand, if the PA draws more power than normal, such as in the case of setting $V_{PA}$ to 4.0V for emergency high-power call, voltage 87 may drop to about 5.08 V. Valley detect circuit 89 then sets a higher current, for example, 400 mA. This higher current level charges capacitor 88 to 8.0V in 3.94 msec, slightly within the 4.06 msec time limit.

The present invention requires a much smaller energy-storage capacitor, 490 μF (270 μF and 220 μF) in comparison with the 4700 μF of the prior art. Yet, it achieves better ripple performance for the RF power amplifier.

In conclusion, the present invention transforms a pulsating load current into a nearly constant DC load current equal to about 15% the prior art current drawn from the battery. The result is reduced source resistance loss and improved efficiency. Furthermore, the present invention extends the usable battery voltage range to 2.8 V from 3.6 V, thus increasing talk time by 40% or more. The present invention also provides an efficiently regulated PA $V_{PA}$ which further extends talk time without over-driving the PA when the battery voltage is substantially higher than what is actually required by the PA. The present invention can also provide an extended communication range (by setting $V_{PA}$ voltage to as high as 4.5V) in an emergency situation.

Although the present invention has been described in considerable detail with reference to certain preferred versions thereof, other versions are possible. Therefore, the spirit and scope of the appended claims should not be limited to the description of the preferred versions contained herein.

What is claimed is:

1. A power converter comprising:
   means for converting a primary power source voltage to a voltage on an energy storage device, including means for maintaining a substantially constant average current to the energy storage device; and
   means for converting the voltage on the energy storage device to an output voltage for a load device, including means for maintaining the output voltage substantially constant to the load device when the load device demands a current pulse.

2. A power converter as recited in claim 1, wherein the primary power source converting means includes a boost converter.

3. A power converter as recited in claim 2, wherein the means for maintaining constant average current to the energy storage device includes a converter control circuit that measures the current provided to the energy storage device and controls the boost converter to maintain the current at a predetermined level.

4. A power converter as recited in claim 1, wherein the energy storage device converting means includes a buck converter.

5. A power converter as recited in claim 1, wherein the means for maintaining constant output voltage at the load device includes a converter control circuit that measures the voltage at the load device and controls the buck converter to maintain the voltage at a predetermined level.

6. A power converter as recited in claim 1, wherein the means for maintaining a substantially constant average current to the energy storage device using current feedback includes a switch and means for sensing current in the switch.

7. A method of providing a power burst to a load device, the method comprising:
   providing a voltage on a reservoir capacitor by converting a voltage and current provided by a primary power source and maintaining an average constant current supplied to the reservoir capacitor, the capacitor voltage being greater than the power source voltage; and
   while maintaining average constant current to the reservoir capacitor,
      converting the capacitor voltage to a predetermined output voltage for the load device, and
      maintaining the predetermined output voltage substantially constant, while providing a current pulse to the load device.

8. The method as recited in claim 7, wherein the current pulse has an on-time and an off-time that are in a ratio of one to seven.

9. The method as recited in claim 7, wherein the power source has a voltage range of 4.6 volts to 2.8 volts.

10. The method as recited in claim 7, wherein the predetermined output voltage is adjustable.

11. The method as recited in claim 7,
   wherein the current pulse has an on-time and an off-time; and
   wherein the average current provided by the primary power source is substantially constant over the on-time and off-time of the current pulse.

12. The method as recited in claim 7, wherein the average constant current supplied to the capacitor is smaller than the current pulse drawn by the load device.

13. A power converter comprising:
   a reservoir capacitor for storing energy obtained from a primary power source;
   a first converter stage configured to convert the primary power source voltage to a voltage on the reservoir capacitor while maintaining a substantially constant average current to the reservoir capacitor; and
   a second converter stage configured to convert the capacitor voltage to an output voltage for a load device while maintaining the output voltage substantially constant and providing a current pulse to the load device.

14. A power converter as recited in claim 13, wherein the first converter stage includes a constant current boost converter circuit.

15. A power converter circuit as recited in claim 14, wherein the constant current boost converter circuit includes:
   an inductor having a first node and second node, the first node of the inductor for receiving a source of primary power, the primary power source being referenced to a reference voltage;
   a first switch having a path connected between the second node of the inductor and an output of the converter circuit, and a first control input that controls the conductivity of the path of the first switch;
   a second switch having a path connected between the second node of the inductor and the reference voltage, and a second control input that controls the conductivity of the path of the second switch;

a current sensing circuit having an input coupled to the second switch to detect an amount of current flowing in the second switch, and an output for providing an indicator of the detected current; and a control circuit having pair of inputs and a pair of outputs, the first output being connected to the first control input to control the state of the first switch, the second output being connected to the second control input to control the state of the second switch, the first input being connected to the connected to the output of the current sensing circuit, and the second input being connected to the output of the converter circuit to detect an output voltage of the converter circuit, wherein the control circuit is operative to control the first and second switches to maintain a ratio of the converter output current to the current in the second switch.

16. A power converter circuit as recited in claim 15, wherein the control circuit includes:

a clock circuit for generating a clock signal and a ramp signal;

a current setting circuit for sensing the voltage of the converter stage output and setting a predetermined current level for the converter output stage;

an operational amplifier having a first input connected to the current sensing circuit, a second input connected to the current setting circuit, the operational amplifier for providing on its output a voltage indicative of the value of the current in the second switch compared to the predetermined current level;

a comparator having a first input connected to the operational amplifier output, a second input connected to the clock circuit to receive the ramp signal, and an output that provides a reset pulse with an adjustable delay; and a flip flop having a set input and a reset input, the set input being connected to the clock circuit, the reset input being connected to the output of the first comparator to receive the adjustable-delay reset pulse, and an output connected to the first control input and the second control input, wherein the delay of the reset pulse is adjusted to maintain the current in the second switch at the predetermined current level.

17. A power converter as recited in claim 13, wherein the second converter stage includes a constant voltage buck converter circuit.

18. A power converter as recited in claim 13, wherein the voltage on the capacitor is substantially greater than the primary power source voltage.

* * * * *